(12) United States Patent
Tanaka et al.

(10) Patent No.: US 6,333,105 B1
(45) Date of Patent: Dec. 25, 2001

(54) MOLDING MATERIAL CONTAINING REINFORCING FIBERS, METHOD FOR PRODUCING MOLDED ARTICLES USING SAME AND SAFETY SHOE TOE CAP

(75) Inventors: Yoshiharu Tanaka, Nyuzen; Takato Takizawa, Kurobe, both of (JP)

(73) Assignee: YKK Corporation, Tokyo (JP)

( * ) Notice: Subject to any disclaimer, the term of this patent is extended or adjusted under 35 U.S.C. 154(b) by 0 days.

(21) Appl. No.: 09/505,881

(22) Filed: Feb. 17, 2000

(30) Foreign Application Priority Data

Feb. 22, 1999 (JP) .................................................. 11-043769

(51) Int. Cl.⁷ ........................................................ D02G 3/00
(52) U.S. Cl. ............................ 428/364; 428/375; 428/394
(58) Field of Search .............................. 264/211.12, 40.4, 264/211.21, 344, 325, 108; 425/206; 428/364, 394, 375

(56) References Cited

U.S. PATENT DOCUMENTS 5,185,117    2/1993  Hawley .
5,188,117  * 2/1993  Hawley ............................ 264/211.12
5,206,085    4/1993  Nakagawa et al. .
5,470,656  * 11/1995 Kennard et al. ...................... 428/370
5,747,137    5/1998  Cutolo et al. .
5,756,206  * 5/1998  Davies et al. ........................ 428/367

FOREIGN PATENT DOCUMENTS 0 207 322   1/1987  (EP) .
2 740 149   4/1997  (FR) .

* cited by examiner

Primary Examiner—Merrick Dixon
(74) Attorney, Agent, or Firm—Finnegan, Henderson, Farabow, Garrett & Dunner, L.L.P.

(57) ABSTRACT

A molding material comprising a reinforcing fiber 1 bundle evenly sheathed by a resin layer 2 and having an oblong shape with at least two lengthwise faces that are flat faces 3; and a method involving thermal preforming of a given amount of the molding material and placing the preformed material into a mold for molding through application of heat and pressure, affording lightweight high-strength molded articles, such as safety shoe toe caps, in high yield.

17 Claims, 4 Drawing Sheets

MOLDING MATERIAL CONTAINING REINFORCING FIBERS, METHOD FOR PRODUCING MOLDED ARTICLES USING SAME AND SAFETY SHOE TOE CAP

BACKGROUND OF THE INVENTION

1. Field of the Invention

The present invention relates to a molding material containing reinforcing fibers for providing molded articles of high strength, such as a safety shoe toe cap; to a method for producing molded articles employing this material; and to a safety shoe toe cap.

2. Description of the Related Art

Glass fibers, which are commonly employed as reinforcing fibers for synthetic resin molded articles, are available both as short fibers and long fibers. Molded articles incorporating long fibers known in the art include those of random mat configuration in which the fibers are distributed with random orientation within a synthetic resin matrix, those of cloth mat configuration in which the fibers are woven, and those in unidirectional configuration, in which the long fibers are arranged with unidirectional orientation.

Of these molded articles, those containing short fibers or those composed of long fibers in random mat configuration do not satisfy the requirements of JIS standards relating to safety shoe toe caps, for example. Long fiber cloth mat and unidirectional configurations, on the other hand, have problems in terms of molding behavior owing to poor flow properties, and even where successfully molded may in some instances require secondary processing, which contributes to higher production costs.

Referring to FIG. 9, which shows in sectional view a resin safety shoe toe cap material approved for use according to Japanese Industrial standards JIS T 8101, the material comprises in a unitary construction two cloth layers 21 situated at the central portion, and random layers (skin layers) 22 arranged on the surfaces to improve moldability and flow properties.

(i) Shoe toe cap materials include L grade (light work) with compressive strength of ≧459 kg; S grade (standard work) with compressive strength of ≧1,020 kg; and H grade (heavy work) with compressive strength of 1,531 kg. For fabrication of resin toe caps, L grade material must incorporate from 2 to 3 cloth layers and S grade material from 4 to 8 cloth layers to reflect the different service requirements; naturally, S grade material, which contains more cloth, will exhibit improved rigidity of the material per se but will also suffer from poor mold insertion behavior, moldabiltiy and flow properties inferior to L grade material, as well as higher defect rates.

(ii) Toe cap materials come in distinct grades, L grade and S grade, with S grade containing a greater number of cloths in the reinforcing layer than L grade, which naturally makes it more expensive.

(iii) Polyamide which exhibits good bonding with the reinforcing fiber is used as the matrix (base material), with reinforcing fiber content typically as high as from 48 to 54%. Moreover, as polyamide per se is water absorbent, and if the roll of material being placed in the mold is not properly set, skin material flow balance vis-a-vis the core material tends to deteriorate during molding, resulting in welds appearing in the molded article and diminished strength on the part of the toe cap. These problems can result in diminished strength due to water absorption and in non-uniform strength in molded articles.

Further, it is necessary to cut the sheet material to the particular dimensions necessitated by the configuration of the molded article, with the cut material then being melted and softened with a far infrared heating oven prior to mold insertion. This process requires mechanical insertion to induce the material to conform to the shape of the mold, so productivity and yield tend to be poor and process control tends to require complicated operations. In some cases, despite good resin impregnation of the reinforcing fibers and satisfactory rigidity, the problem of poorer flex resistance than unimpregnated or semi-impregnated products arises.

To solve problems relating to dimensions when the sheet is subsequently cut and molded, there has been developed a process wherein a composite molding material containing reinforcing fibers oriented in a specific direction is cut to a predetermined configuration, arranged together in a planar configuration, heated, and pressed to effect molding. However, this process involves resin impregnation of the reinforcing fibers from the outset, which leaves unsolved problems relating to flex resistance of the molded article and precludes the possibility of manipulating compression resistance or shock cushioning properties. Further, the composite molding material has considerable length (on the order of 11 mm) in tubular configuration. Materials of this configuration, when weighed and integrated, are difficult to stack in random directions and tend to become oriented in a single direction, with the result that the physical properties of the molded article are strong in the direction of the orientation of fibers but weak in a direction 90° with respect to the direction of the orientation of fibers.

SUMMARY OF THE INVENTION

Accordingly, it is an object of the invention to provide a molding material containing reinforcing fibers offering ease of fabrication and good flexibility. It is a further object to provide a safety shoe toe cap having excellent strength.

To solve the problems cited above, the invention encompasses the following aspects.

(1) A molding material containing reinforcing fibers, comprising a reinforcing fiber bundle evenly sheathed by a resin layer and having an oblong shape with at least two lengthwise faces that are flat faces.

(2) The molding material containing reinforcing fibers recited in (1), wherein length is from 3 to 50 mm, width is from 1 to 40 mm, and thickness is from 0.1 to 10 mm.

(3) The molding material containing reinforcing fibers recited in (1), wherein reinforcing fiber content is from 45 to 80 wt %.

(4) The molding material containing reinforcing fibers recited in (1), wherein the resin layer consists of a thermoplastic resin selected from polyamide, polybutylene terephthalate, polyphenylene sulfide, polypropylene, and polyethylene terephthalate, and the reinforcing fiber is a fiber selected from glass fibers, carbon fibers, aramid fibers, and metal fibers.

(5) A method for producing a molded article containing reinforcing fibers, comprising the steps of premolding a given quantity of a pellet material of an oblong shape comprising a reinforcing fiber bundle evenly sheathed by a resin layer and having at least two lengthwise faces that are flat faces; and placing the preformed material into a mold and applying heat and pressure to effect molding.

(6) A safety shoe toe cap, produced by assembly and consolidation of an oblong molding material comprising a reinforcing fiber bundle evenly sheathed by a resin layer and having at least two lengthwise faces that are flat faces.

An example of the molding material M containing reinforcing fibers of the invention is depicted in FIGS. 1 to 3. A bundle of reinforcing fibers 1 is evenly sheathed by a resin layer 2, with the overall configuration being a flattened oblong shape. Flat surfaces 3, 3 are present at top and bottom. The bundle of reinforcing fibers 1 may be bundled with the long fibers arrayed parallel; partial twist may be applied.

The resin layer 2 may be formed by means of injection, coating, or sheathing with film. Suitable dimensions of the molding material are l=from 3 to 50 mm, w=from 1 to 40 mm, and t=from 0.1 to 10 mm. Reinforcing fiber content of from 45 to 80 wt % is acceptable.

FIG. 4 is another example depicting an exterior configuration approximating a prism. Here, four flat faces 4 are provided. The resin layer 2 is formed over a circular bundle of reinforcing fibers 1 by means of injection. Here, values for l, w, and t and reinforcing fiber content are analogous to the case of FIGS. 1 to 3. Alternatively, a configuration having at least two lengthwise flat faces is also acceptable. The stipulation of at least two flat faces stems from the fact that where only one flat face is provided, as molding materials M serially descend within the mold during the molding process, where the non-flat face portion of a subsequently descending molding material contacts the top of the previously descending molding material, stability will be poor and there will be a strong tendency towards mispositioned descent, with the result that the fibers of the previous molding material M and those of subsequent molding material M will be codirectional. Where two or more flat faces are provided, on the other hand, no flat face of a subsequently descending molding material M will suffer mispositioned descent onto the previous molding material M, there being a strong tendency to become superposed while maintaining the angle during descent. In this state, molding through the application of heat and pressure creates uniform fiber entanglement and increased strength on the part of the molded article.

Examples of the resin layer 2 include those consisting of thermoplastic resin, such as polyamide (nylon 6, nylon 66, nylon 12), polypropylene (PP), polycarbonate (PC), polybutylene terephthalate (PBT), polyphenylene sulfide (PPS), polyether ether ketone (PEEK), polyethylene terephthalate (PET) or the like, or of a polybutylene terephthalate (PBT)-polycarbonate (PC) polymer alloy, etc. The use of polyamide (nylon 6), polybutylene terephthalate, polyphenylene sulfide, polypropylene, or polyethylene terephthalate is preferred owing to their low viscosity and ease of molding.

Glass fibers (GF), carbon fibers (CF), aramid fibers, and metal fibers (steel fibers, stainless steel fibers) are favorable for use as reinforcing fibers 1.

A detailed description of the production method is now provided.

Typically, the molding material of the invention is molded by a series of processes including (a) weighing; (b) application of heat and pressure; (c) charging to a mold; (d) molding; (e) secondary processing; and (e) completion.

Referring to FIG. 5, the first method involves amassing the weighed molding material M within a compression mold 6 equipped with a heating element 5, and lowering the cylinder 7 to effect premolding through the application of heat and pressure. The preformed consolidated element 8 is then ejected from compression mold 6 by an ejector 9 in the manner depicted in FIG. 6. Next, the consolidated element 8 is placed within a mold section 13 of a lower mold 11 of a mold 12 composed of an upper mold 10 and a lower mold 11, as shown in FIG. 7, and is then pressed and shaped to the desired configuration by the upper mold 10.

DESCRIPTION OF THE PREFERRED EMBODIMENTS

By way of an embodiment of the invention there is now described an example of manufacture of a composite material for use as a toe cap in a safety shoe, using glass fibers as the reinforcing fibers and polyamide (nylon 6) as the resin layer.

Long fibers consisting of glass fiber are bundled into flattened configuration about 1.9 mm in width and about 0.4 mm in thickness and drawn out continuously while evenly coating the surface with a layer of polyamide resin (nylon 6) about 2 to 3 mm in width and about 0.5 to 1.2 mm in thickness. The material is cut to lengths of about 1 inch (25.4 mm) to produce a molding material. Glass fiber content is 50 wt %.

Figure 1:
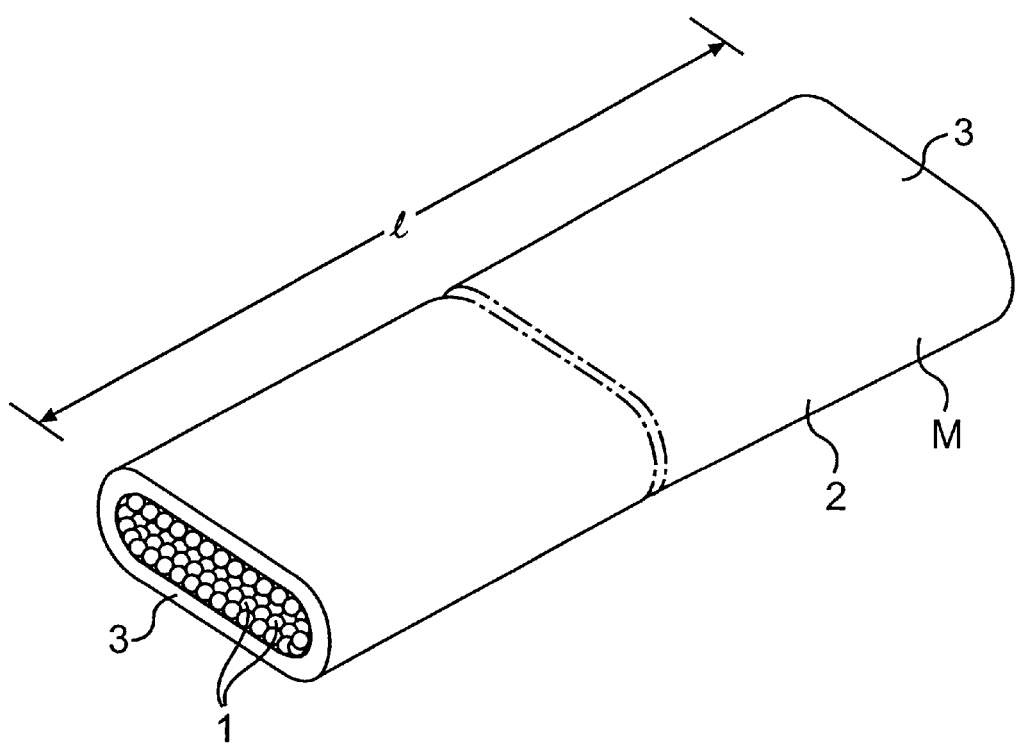
FIG. 1 is a perspective view showing an example of the molding material of the invention.
Figure 2:
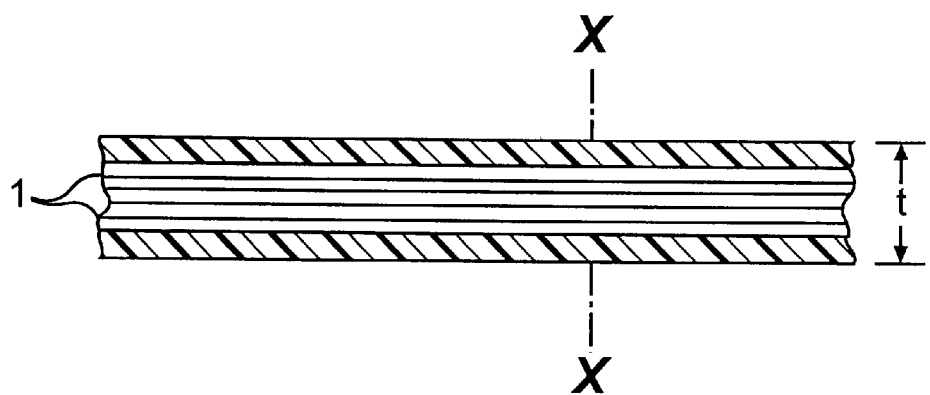
FIG. 2 is a longitudinal section of FIG. 1.
Figure 3:
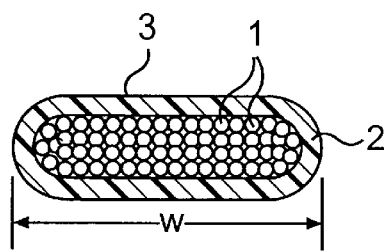
FIG. 3 is an X—X section of FIG. 2.
Figure 4:
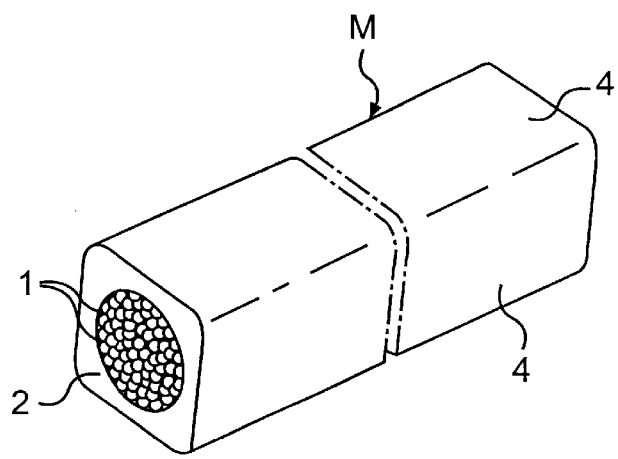
FIG. 4 is a perspective view showing another example of the molding material of the invention.
Figure 5:
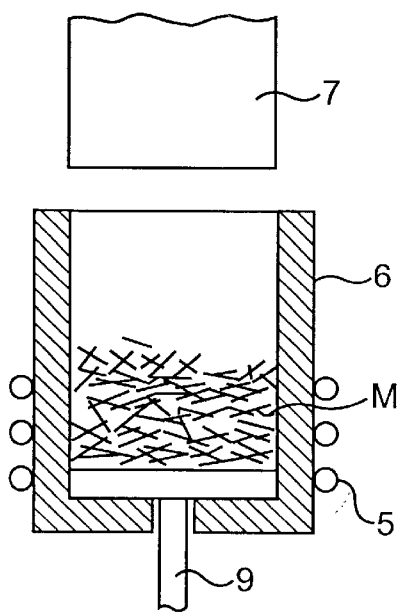
FIG. 5 is a perspective view showing an example of the compression mold employed in the production method of the invention.
Figure 6:
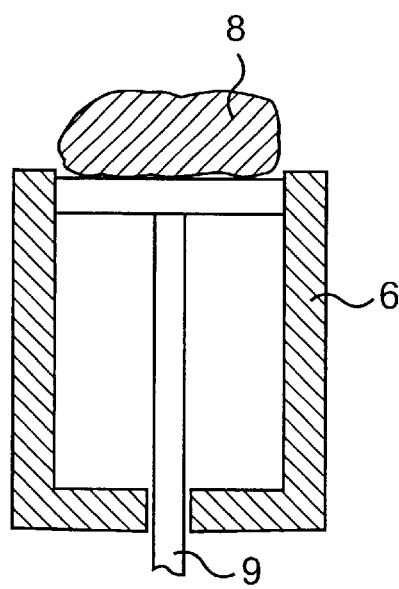
FIG. 6 is a sectional view showing the consolidated element being ejected from the compression mold.
Figure 7:
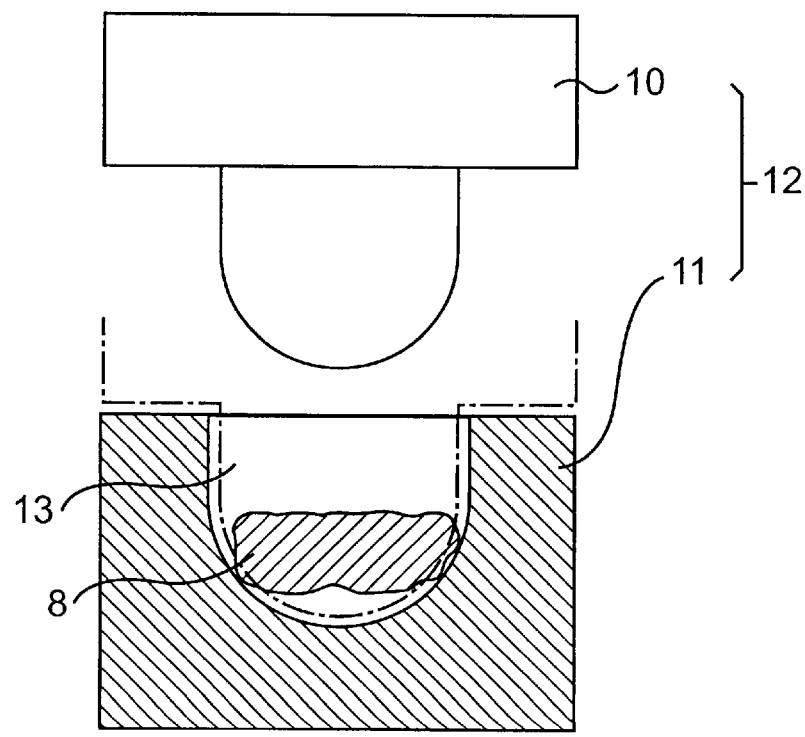
FIG. 7 is a sectional view showing an example of a mold.

The resultant molding material is weighed and amassed within a compression mold 6 as shown in FIG. 5. Applying heat by means of the heating element 5, cylinder 7 is lowered to bring about fusion of the resin layer and give a preformed consolidated element 8. This is ejected from the mold in the manner depicted in FIG. 6 and then placed within the mold section 13 of the lower mold 11 of a mold 12, as shown in FIG. 7, and is molded into a safety shoe toe cap of the desired configuration by lowering the upper mold 10.

By way of comparative example 1, molding was carried out as in the preceding inventive example, except for using a resin-penetrated molding material containing 50 wt % glass fibers having a circular cross section about 2 mm in diameter and length of 11 mm to produce a safety shoe toe cap.

By way of comparative example 2, a panel of polyamide-impregnated woven glass-fiber cloth was cut into small pieces about 1 inch (25.4 mm) in length to produce molding materials with glass fiber content of about 50 wt % which were assembled and subjected to heat and pressure to produce a safety shoe toe cap.

Strength data for the toe caps produced in the example and comparative examples 1 and 2 is given in Table 1.

TABLE 1

| Item | Compressive strength (kg) | | | JIS standard | In-house standard |
|---|---|---|---|---|---|
| | maximum | minimum | Average | | |
| Example | 2000 | 1700 | 1920 | 1020 kg | 1500 kg |
| Comparative example 1 | 1570 | 1010 | 1430 | | |
| Comparative example 2 | 1720 | 1480 | 1550 | | |

As will be apparent from the data presented in Table 1, in the case of the example, a material approximating L grade in terms of its relatively low reinforcing fiber content (content 50 wt %) nevertheless exceeded JIS standards for S grade of JIS T 8101, as well as the higher in-house standard.

On the other hand, in the case of comparative example 1, minimum compressive strength fell below the JIS standard and on average fell below the in-house standard that has been devised in-house. In the case of comparative example 2, minimum compressive strength fell below the in-house standard.

On the other hand, where molding was carried out with reinforcing fiber content at the higher level required for S grade material, satisfactory values for strength were obtained, but the high reinforcing fiber content (65 wt %) made the toe cap heavy so that adequate weight reduction was not achieved. Conversely, the invention affords molding of S grade toe caps using material approximating L grade in terms of its relatively low reinforcing fiber content, and provides adequate strength as well as a lighter material.

Figure 8:
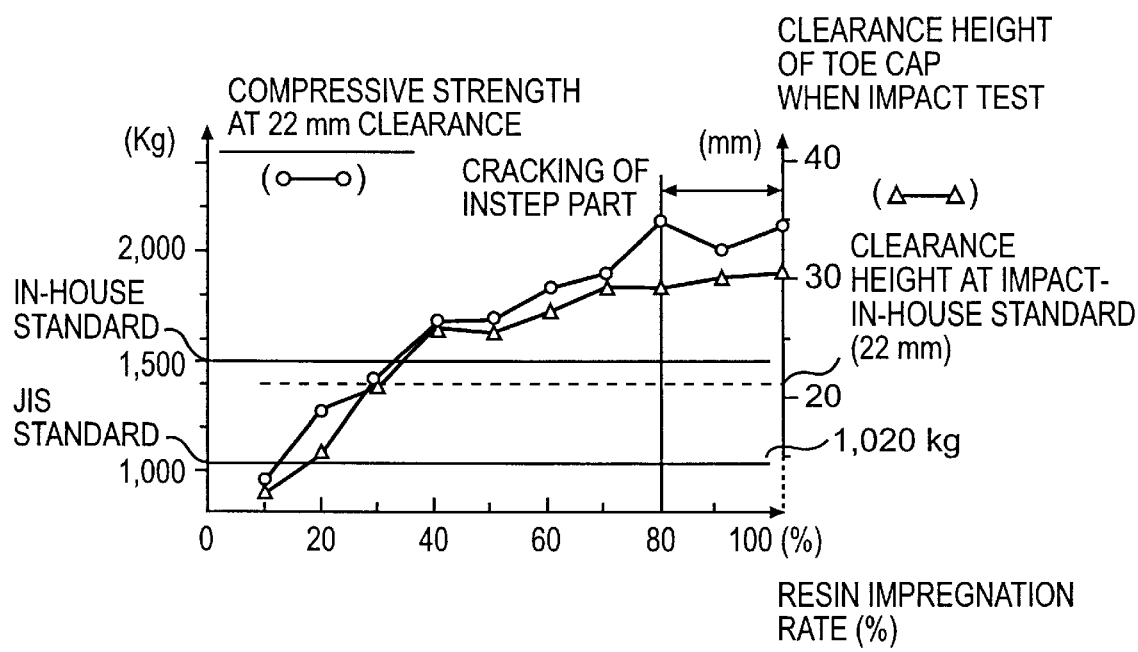
FIG. 8 is a graph of the relationship between the rate of resin impregnation and strength in the invention.
Figure 9:
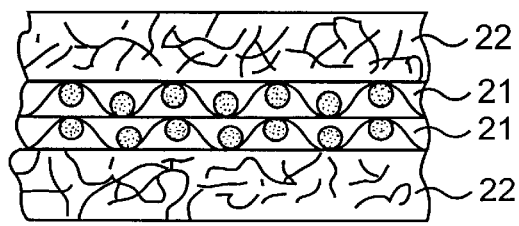
FIG. 9 is a sectional explanatory diagram of a JIS standard approved toe cap material.

Whereas the resin component of the sheathing resin layer is induced by heating temperature, heating time, and applied pressure during molding to impregnate gaps and the like in the reinforcing material bundle, FIG. 8 shows the results of an investigation as to the relationship between the rate of impregnation of glass fibers by the resin component on the one hand and an arch-shape molded shoe toe cap on the other, presented in the form of a graph of the relationship between the rate of impregnation and each of the toe cap height (indicated by Δ, mm) during impact tests under conditions for S grade of JIS T 8101 and the compressive strength (indicated by O, kg) of the single toe cap when the clearance at the end of the arch-shaped toe cap is 22 mm. From this graph it will be apparent that, during the molding process, where the rate of impregnation by the resin into the reinforcing fiber bundle exceeds 80%, the product exhibits high compressive strength but experiences rupture in the instep part, while less than 40% is associated with inadequate strength; thus, the proper scope for the impregnation rate for impregnation of the reinforcing fiber bundle with molding is, in the case of the example, from 40 to 80%. This must be taken into consideration when molding. In the preceding, the remaining 20 to 60% of the resin component indicates that remaining as the resin layer. For example, the example described herein employs a molding material with a glass fiber content of 50 wt %; in the case of a 50% impregnation rate, the resin (nylon 6) constitutes 50 wt %, with 25 wt % thereof impregnating the glass fiber bundle and the remaining 25 wt % maintaining the form of a resin layer sheathing the glass fiber bundle.

The molding material of the invention is easily weighed, and when employed in molding is readily matched to product size and requires a minimum of secondary processing (such as removal of burrs) so that material yield is improved. The provision of two or more flattened faces ensures a high rate of remaining in position during descent when integrated through descent in the mold, and minimizes the incidence of codirectional orientation of the reinforcing fibers, ensuring adequate entanglement of reinforcing fibers within the product and improved strength. Since reinforcing fibers in bundle form are present within the resin sheath, irregularities in composition are minimized and breakage of reinforcing fibers is also minimized. According to the production method of the invention, a product of light weight and high strength can be obtained utilizing the advantageous properties of the molding material of the invention described hereinabove; further, manipulation of the extent of resin impregnation of the reinforcing fibers by controlling temperature and dwell time during heating and pressing gives a product that, taking the example of a toe cap for a safety shoe, has strength approximating that of S grade using an L grade material having relatively low reinforcing fiber content.

What is claimed is:

1. A molding material containing reinforcing fibers, comprising a reinforcing fiber bundle evenly sheathed by a resin layer and having an oblong shape with at least two lengthwise faces that are flat faces.

2. The molding material containing reinforcing fibers recited in claim 1, wherein length is from 3 to 50 mm, width is from 1 to 40 mm, and thickness is from 0.1 to 10 mm.

3. The molding material containing reinforcing fibers recited in claim 1, wherein reinforcing fiber content is from 45 to 80 wt %.

4. The molding material containing reinforcing fibers recited in claim 1, wherein the resin layer comprises at least one thermoplastic resin selected from the group consisting of polyamide, polybutylene terephthalate, polyphenylene sulfide, polypropylene, and polyethylene terephthalate, and the reinforcing fiber comprises at least one fiber selected from the group consisting of glass fibers, carbon fibers, aramid fibers, and metal fibers.

5. A method for producing a molded article containing reinforcing fibers, comprising premolding a given quantity of a molding material of an oblong shape comprising a reinforcing fiber bundle evenly sheathed by a resin layer and having at least two lengthwise faces that are flat faces; and placing the preformed material into) a mold and applying heat and pressure to effect molding.

6. A safety shoe toe cap, produced by assembly and consolidation of an oblong molding material comprising a reinforcing fiber bundle evenly sheathed by a resin layer and having at least two lengthwise faces that are flat faces.

7. The molding material containing reinforcing fibers recited in claim 1, wherein the molding material has a length of from 3 to 50 mm, a width of from 1 to 40 mm, and a thickness of from 0.1 to 10 mm, and has a reinforcing fiber content of from 45 to 80 wt %.

8. The molding material containing reinforcing fibers recited in claim 1, wherein the reinforcing fiber bundle is substantially circular.

9. The molding material containing reinforcing fibers recited in claim 1, wherein the fibers are arrayed parallel.

10. The molding material containing reinforcing fibers recited in claim 1, wherein the fibers are twisted.

11. The method recited in claim 5, wherein the molding material has a length of from 3 to 50 mm, a width of from 1 to 40 mm, and a thickness of from 0.1 to 10 mm, and has a reinforcing fiber content of from 45 to 80 wt %.

12. The method recited in claim 5, wherein the resin layer is formed by means of injection.

13. The method recited in claim 5, wherein the resin layer is formed by means of coating.

14. The method recited in claim 5, wherein the resin layer is formed by means of sheathing with film.

15. The safety shoe toe cap recited in claim 6, wherein the molding material has a length of from 3 to 50 mm, a width of from 1 to 40 mm, and a thickness of from 0.1 to 10 mm, and has a reinforcing fiber content of from 45 to 80 wt %.

16. An article, comprising a safety shoe toe cap having reinforcing fibers in bundle form.

17. An article as recited in claim 16, wherein the reinforcing fibers in bundle form are sheathed by a resin layer.

* * * * *